US006378883B1

(12) United States Patent
Epstein

(10) Patent No.: US 6,378,883 B1
(45) Date of Patent: Apr. 30, 2002

(54) MOTORIZED WALKER/WHEELCHAIR AND METHOD

(76) Inventor: Aaron J. Epstein, 3470 Windmill Ranch Rd., Weston, FL (US) 33331

( * ) Notice: Subject to any disclaimer, the term of this patent is extended or adjusted under 35 U.S.C. 154(b) by 0 days.

(21) Appl. No.: 09/480,639

(22) Filed: Jan. 11, 2000

(51) Int. Cl.[7] .................................................. B62M 1/14

(52) U.S. Cl. ................... 280/250.1; 280/650; 280/47.4; 180/6.5; 180/65.5; 180/65.6; D12/130; D12/131

(58) Field of Search ............................... 180/65.1, 65.5, 180/65.6, 19.1, 6.5, 907; 135/66, 67; 280/250.1, 650, 47.38, 47.4; 297/330; D12/130, 131

(56) References Cited

U.S. PATENT DOCUMENTS

| | | | | | |
|---|---|---|---|---|---|
| 3,736,021 | A | * | 5/1973 | MacLaren | 297/42 |
| 3,807,520 | A | | 4/1974 | Chisholm | 180/6.5 |
| 3,872,945 | A | * | 3/1975 | Hickman et al. | 180/65.6 |
| 3,955,639 | A | | 5/1976 | Cragg | 180/6.5 |
| 4,140,192 | A | | 2/1979 | Sharpe | 180/6.5 |
| 4,280,578 | A | * | 7/1981 | Perkins | 180/6.5 |
| 4,386,672 | A | | 6/1983 | Coker | 180/13 |
| 4,407,543 | A | * | 10/1983 | Mashuda | 297/330 |
| 4,415,177 | A | * | 11/1983 | Hale et al. | 280/650 |
| 4,802,542 | A | | 2/1989 | Houston et al. | 180/65.5 |
| 4,809,804 | A | | 3/1989 | Houston et al. | 180/65.5 |
| 4,825,971 | A | | 5/1989 | Bernstein | 180/65.1 |
| 4,826,241 | A | * | 5/1989 | Barras | 297/16 |
| 5,016,720 | A | | 5/1991 | Coker | 180/13 |
| 5,022,476 | A | | 6/1991 | Weege | 180/6.5 |
| 5,060,967 | A | * | 10/1991 | Hulterstrum | 280/650 |
| 5,137,102 | A | | 8/1992 | Houston, Sr. et al. | 180/65.5 |
| 5,253,724 | A | | 10/1993 | Prior | 180/65 |
| 5,263,728 | A | * | 11/1993 | Patel et al. | 280/42 |
| 5,265,689 | A | * | 11/1993 | Kauffmann | 180/65.5 |
| 5,366,036 | A | * | 11/1994 | Perry | 180/65.1 |
| 5,370,572 | A | * | 12/1994 | Lee | 446/462 |
| 5,401,045 | A | * | 3/1995 | Foerster et al. | 280/250.1 |
| D360,174 | S | * | 7/1995 | Kjell et al. | D12/130 |
| 5,451,193 | A | * | 9/1995 | Pickard | 482/68 |
| 5,495,904 | A | * | 3/1996 | Zwaan et al. | 180/11 |
| 5,524,720 | A | | 6/1996 | Lathrop | 180/19.2 |
| 5,526,893 | A | | 6/1996 | Higer | 180/65.1 |
| 5,556,120 | A | * | 9/1996 | Davis | 280/304.1 |
| 5,558,358 | A | * | 9/1996 | Johnson | 280/648 |
| 5,605,345 | A | * | 2/1997 | Erfurth et al. | 280/250.1 |
| 5,752,710 | A | | 5/1998 | Roberts | 280/91.1 |
| 5,778,996 | A | * | 7/1998 | Prior et al. | 180/65.1 |
| 5,794,639 | A | * | 8/1998 | Einbinder | 135/67 |
| 5,887,887 | A | * | 3/1999 | Keuning | 280/641 |
| 5,944,131 | A | | 8/1999 | Schaffner et al. | 180/65.1 |
| 6,079,725 | A | * | 6/2000 | Lazaros | 280/250.1 |
| 6,113,128 | A | * | 9/2000 | Watkins | 280/647 |
| 6,183,002 | B1 | * | 2/2001 | Choi et al. | 280/647 |
| 6,231,067 | B1 | * | 5/2001 | Johnson et al. | 280/650 |

OTHER PUBLICATIONS

Preferred Healthcare, Cruiser Deluxe Junior, www.phc–online.com.*

* cited by examiner

*Primary Examiner*—Brian L. Johnson
*Assistant Examiner*—Daniel Yeagley
(74) *Attorney, Agent, or Firm*—Jack E. Dominik

(57) ABSTRACT

A motorized walker/wheelchair having wheels, an A-frame which has a driven a leg and a rolling leg which join at a vertex. Rising from one of the legs there is a control handle assembly. A motor wheel, or optionally two motor wheels, are provided at the lower portion of the driven leg of the A-frame. A caster wheel extends from the bottom of the rolling leg. Provision is made for a seat which is secured at its rearward portion to the seat support spreader. Hand controls are provided to the handle support which in turn control the operation of at least one motor driven wheel, or optionally, to separate motors driving two wheels. The two legs, the driven leg and a rolling leg, are joined at a pivot point at their vertex. Beneath the pivot point is a leg bridge which folds, thereby permitting the bridge beam to be raised upwardly which subsequently permits the driver wheel-caster arrangement to move in close proximity to each other while the seat folds upwardly and the entire unit transfers itself into the portable or folded mode.

6 Claims, 5 Drawing Sheets

MOTORIZED WALKER/WHEELCHAIR AND METHOD

FIELD OF THE INVENTION

The present invention relates to a walker/wheelchair which is both powered and portable. Walkers and wheelchairs, in combination, are exemplified in U.S. Pat. No. 5,137,102 which is classified in U.S. Class 180, Sub-Class/65.5.

BACKGROUND OF THE INVENTION

Wheelchairs have been known for years. In addition, the wheelchairs have been powered in various forms. Also, walkers of various kinds have been used. The most common walker has a pair of inverted hairpin shaped portions joined in the middle by crossbars. The user lifts the walker every time he wants to move. However, the advantage of such walkers is that they can be folded for carrying in the trunk of the car, or storage out of the way at home. While there is shown and described in U.S. Pat. No. 5,137,102 a combination wheelchair and walker apparatus which is also powered, it becomes apparent from a study of the structure that it cannot be made portable or folded into a compact configuration for storage or for carrying in a vehicle. In addition, while there is a back support, the back support precludes the folding of the unit, and also it becomes clumsy in the walker mode. What is truly needed is a powered walker and wheelchair combination which can also be folded for storage, for carrying in a vehicle, or otherwise reducing the space taken by the unit when not in use. A further desirability is to provide such a combination walker and wheelchair which can be easily powered by hand controls in either direction and even more importantly can be steered in almost infinitely variable patterns.

SUMMARY OF THE INVENTION

The present invention derives from the employment of an A-frame which has a driven a leg and a rolling leg which join at a vertex. Rising from one of the legs there is a control handle assembly. A motor, or optionally two motors, are provided at the lower portion of the driven leg of the A-frame. A caster wheel extends from the bottom of the rolling leg. Provision is made for a seat which is secured at its rearward portion to the seat support spreader. Hand controls are provided on the handle support which in turn control the operation of at least one motor driven wheel, or optionally, two separate motors driving two wheels. The two legs, the driven leg and a rolling leg, are joined at a pivot point at their vertex. Beneath the pivot point is a leg bridge which folds, thereby permitting the bridge beam to be raised upwardly which subsequently permits the driver wheel-caster arrangement to move in close proximity to each other while the seat folds upwardly and the entire unit transfers itself into the portable or folded mode. Optionally, a retractable footrest for the wheelchair mode serves as a standard ride support in the walker mode.

In view of the foregoing is it a principal object of the present invention to provide a portable walker wheelchair which is highly maneuverable in a powered mode and yet portable for easy carrying or storage. Yet a related object of the present invention is to provide such a walker wheelchair which also requires a low amount of battery power so that its maneuverable range is extended without sacrificing a significant amount of weight reduction and therefore power consumption. A related object of a standing walker is also achieved.

Yet another object of the present invention is to provide a powered portable walker wheelchair which may be assembled from several readily formed tubular metal parts and does not require special-purpose tooling which in turn will increase the cost of production.

Not lastly, a further object of the present invention is to provide a method for folding the unit for storage which can still be undertaken by the partially handicapped user.

DESCRIPTION OF THE ILLUSTRATIVE DRAWINGS

Further objects and advantages in the present invention will become apparent as; the following description proceeds taken in conjunction with the accompanying drawings in which a preferred embodiment of the subject portable powered walker wheelchair is shown and described.

FIG. 1 is a front quarter perspective view of the subject walker/wheelchair;

FIG. 1*a* is a broken perspective of one view of the footrest in operation;

FIG. 1*b* is another perspective view of the same footrest in its retracted configuration;

DESCRIPTION OF THE PREFERRED EMBODIMENT

Figure 1:
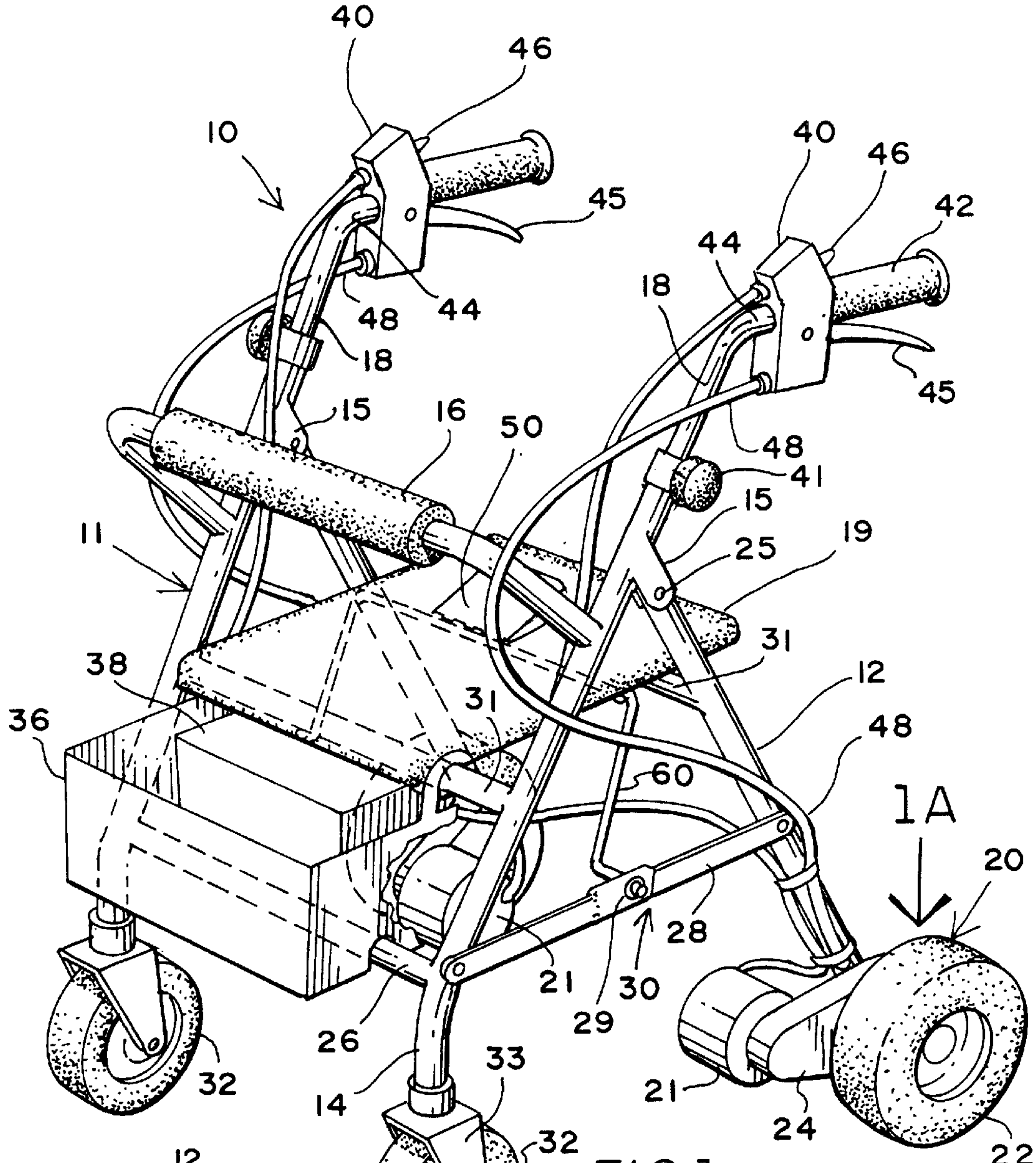
Figure 1A:
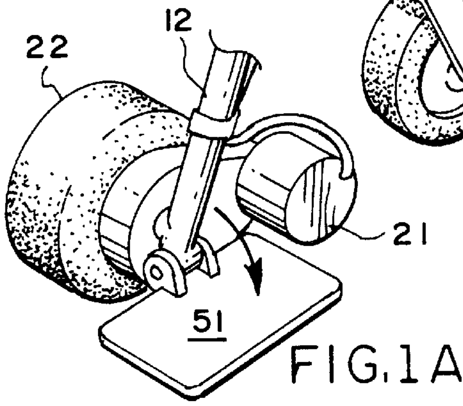
Figure 1B:
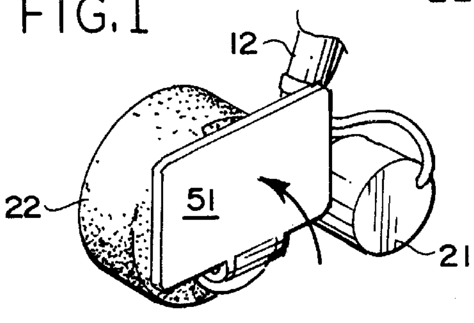

Turning now to FIG. 1 it will be seen that a walker/wheelchair 10 is shown in which an A-frame 11 is provided with a driven leg 12 and a rolling leg 14. The two legs are pivoted at a vertex 15. A backrest seat support 16 is secured to the forward portions of a rolling leg 14 of the A-frames 11. The legs 11 and 12 are secured by a vertex pivot 25.

Control arm 18 tends upwardly from a vertex 15 where the two legs are pivotally joined at the vertex 15. A seat 19 is hinged to the cross-member at the lower portion of the backrest seat support 16 which becomes either a seat to maintain the wheelchair mode or a table for resting items being carried by the patient while in the walker mode.

As will be noted, motor wheels 20 are provided at the lower portion of the driven legs 12 having a drive axle with a drive axis rotatably connected to the lower portion of the driven legs. A motor 21 is provided for each of the motor wheels 20. Each motor 21 in turn is connected to its related motor wheel 22 by a gear drive 24. As will be explained later, particularly when there are two motors 21, an infinity of motions can be accomplished by the user. Desirably, a clutch disengages the motor and gear box for ease of movement.

To aid and help form the portable mode, a folding bridge beam 28 is secured to each of the legs 12, 14 at a mid-portion of such legs. A bridge beam lock 29 secures or unlocks the bridge beam 28. An H forming spreader 30 is secured pivotally between the two legs to hold them in the spaced position during operation to open the entire unit and yet by bringing the wheels toward each other, goes into the folded compact configuration. Hand tightener 41 permits telescoping the upper portion of the rolling leg 14 to adjust the height of the handle 44 and adjustable hand grip 42.

The seat support spreader 31 serves a two-fold purpose of securely spreading and positioning the driven leg 12 and the rolling leg 14 as well as supporting the seat. Also it should be noted from FIG. 1 that the caster made up of the caster wheel 32 and bracket 33 which are held in their spaced relationship by the leg bridge 26. In addition, the backrest seat support 16 also serves to maintain its spaced condition between the two rolling legs 14.

Figure 2:
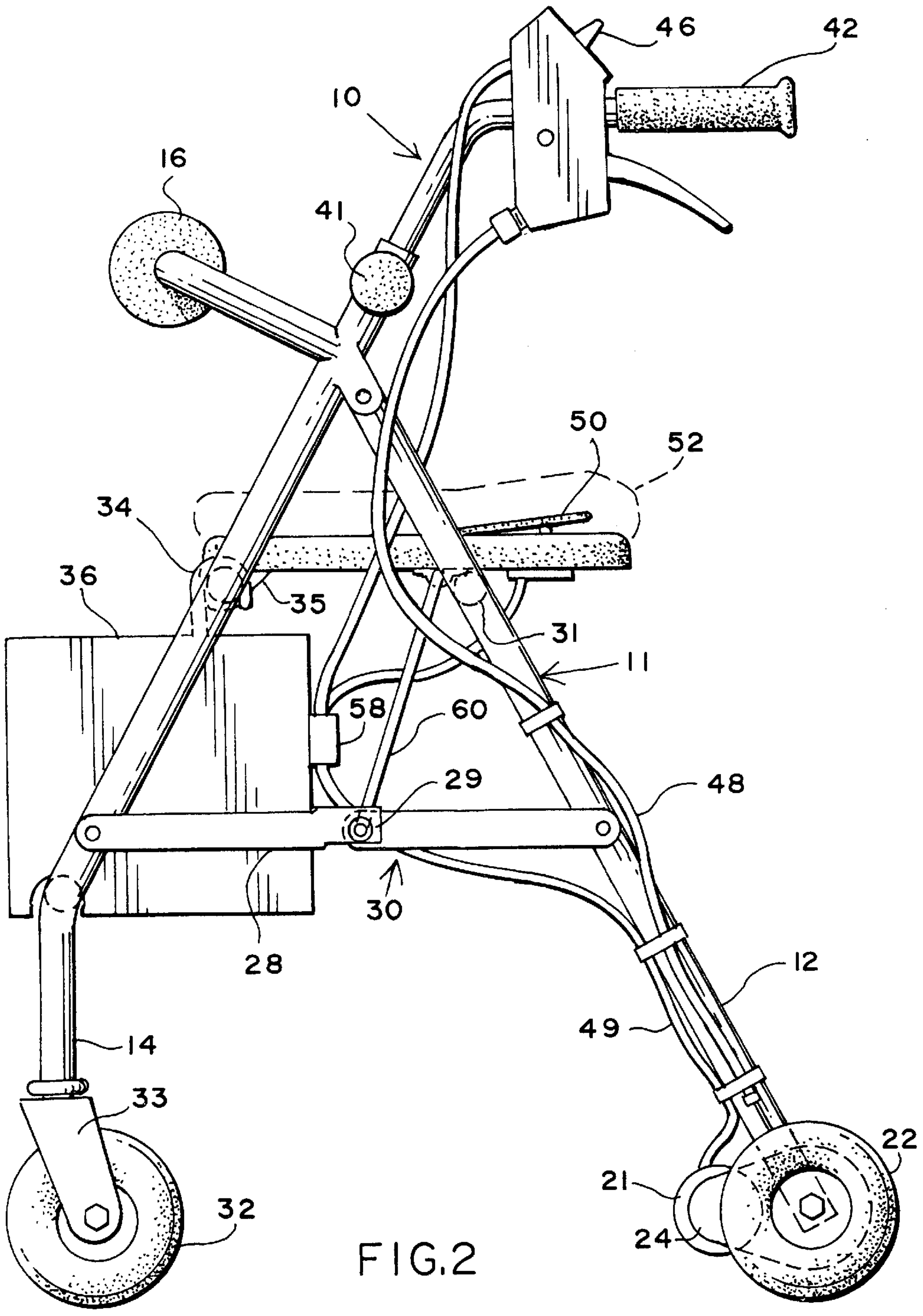
FIG. 2 is a side elevation of the walker/wheelchair.
Figure 3:
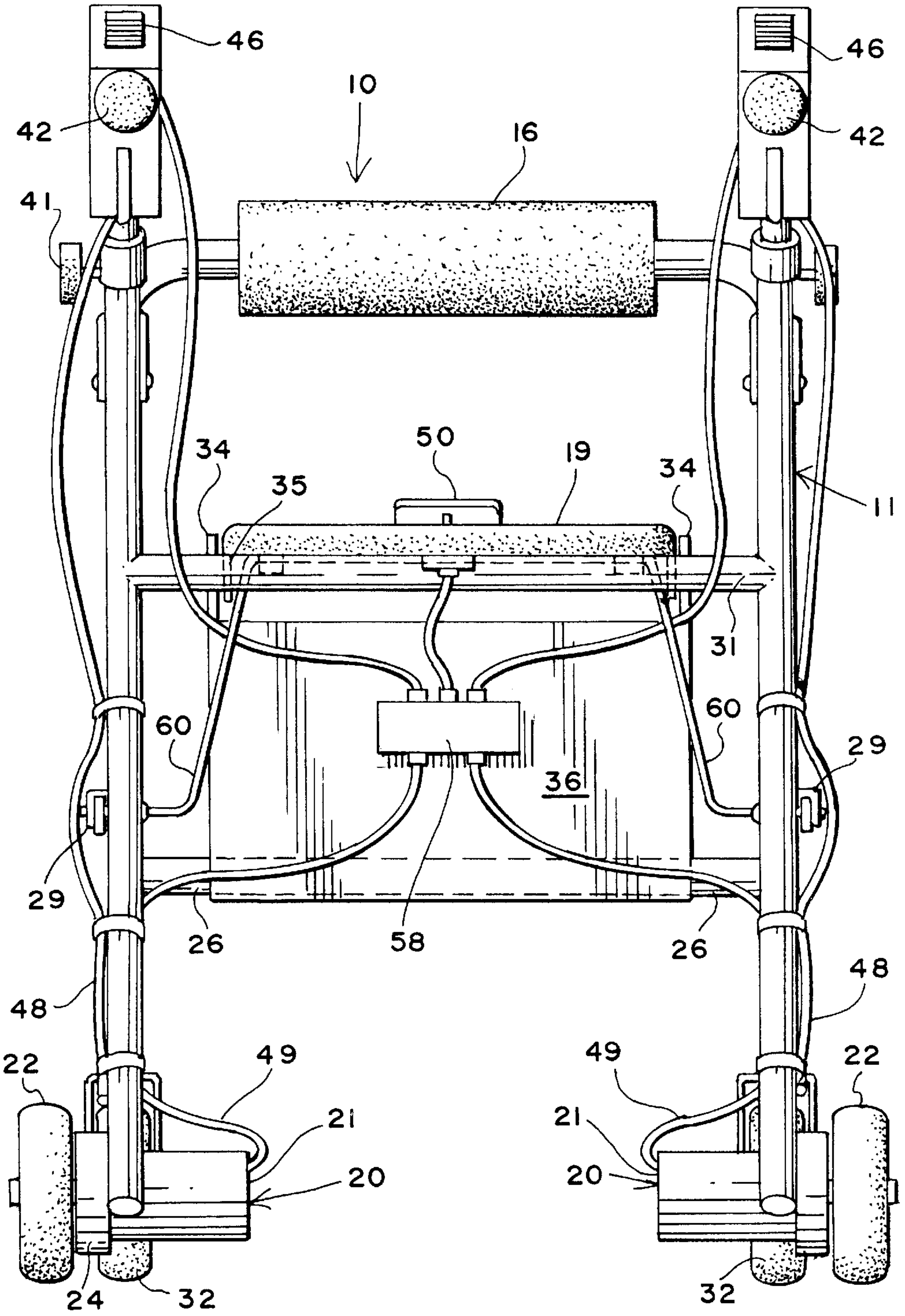
FIG. 3 is a rear view of the subject walker/wheelchair.
Figure 4:
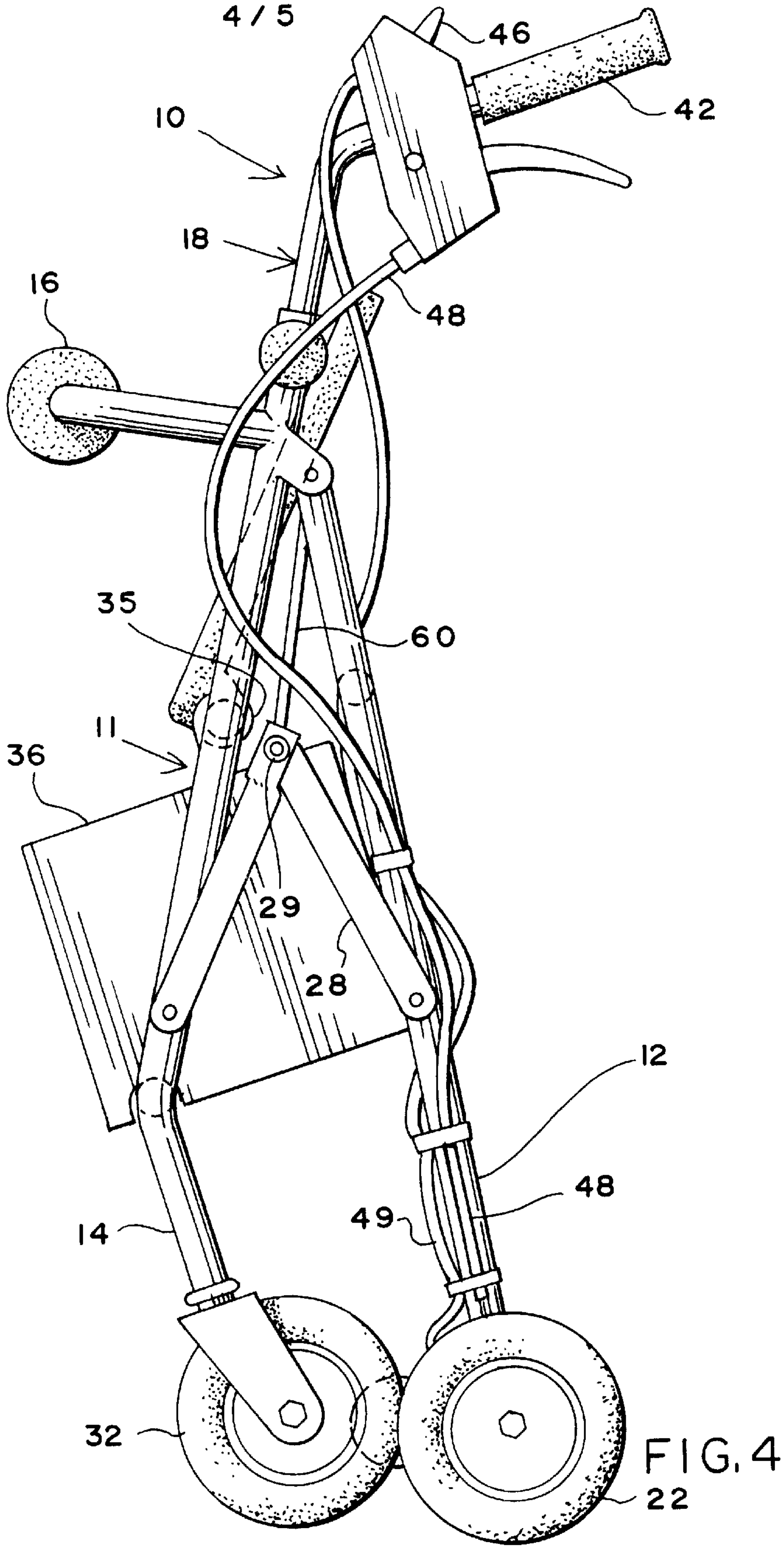
FIG. 4 is a side view of the subject walker/wheelchair in the folded configuration.

The backrest seat support 16 and the seat are secured to the seat support spreader 31 with and hinged thereto by means of seat hinges 35. A power box 36 is secured beneath the seat and overlies the casters. The power box 36 contains the power source 38 and is also large enough to carry personal items or even the items purchased at the grocery store, drugstore, or elsewhere. The power box 36 is secured to the seat support 31 by power box hanger 34 (see FIG. 2). Ideally the battery power source is a rechargeable CAD, of either 6 or 12 volts, depending upon the type of motor 21 selected to drive the drive wheels 22. Hand controls 40 are positioned at the upper portion of the hand control extensions secured above the vertex of the two legs. There is an adjustable handle 44 with a fixed handgrip 42. Added to that, provisions are made for a brake control 45. Power switch 46 is provided on both handles in order to establish forward, reverse, or disconnect.

Figure 5:
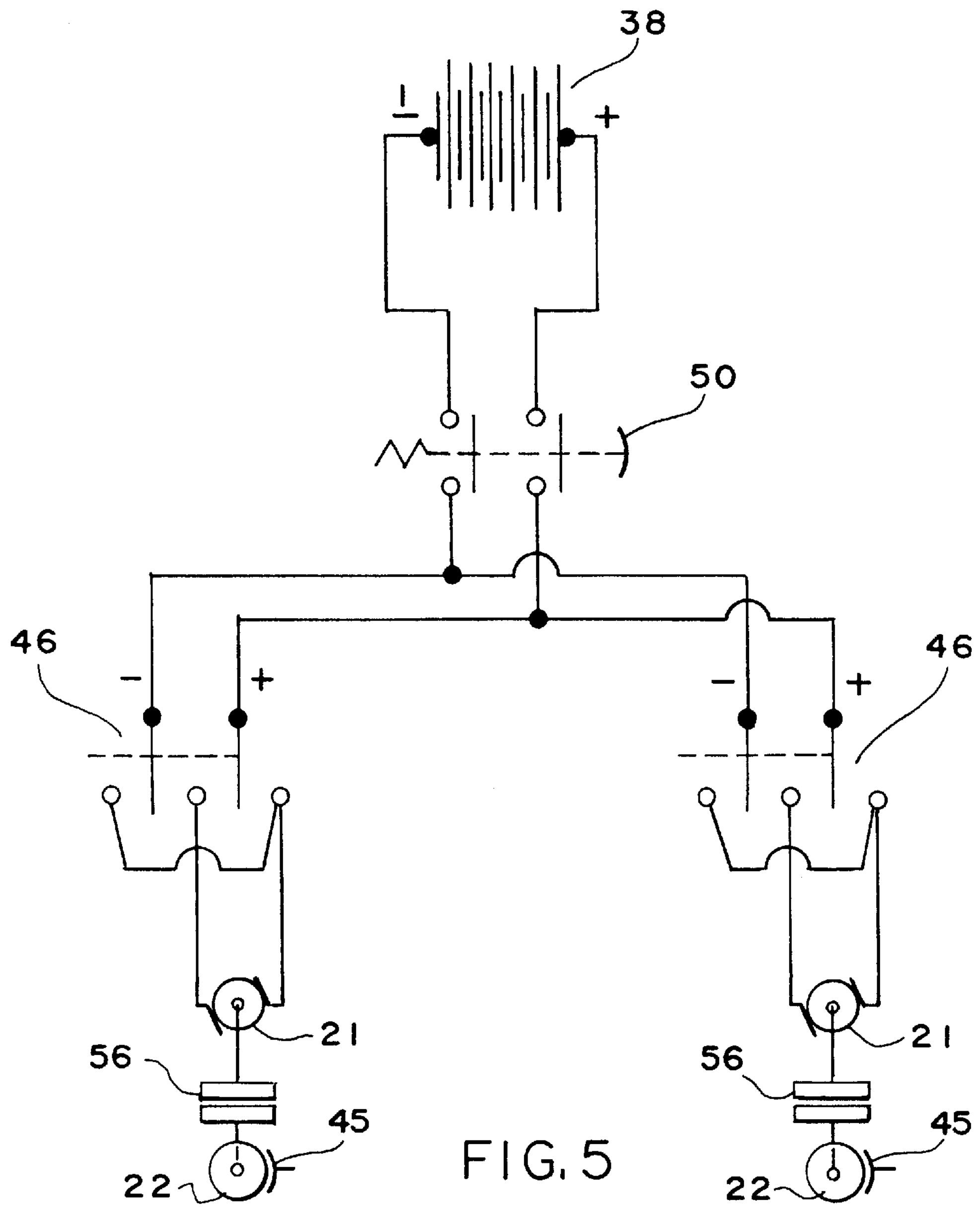
FIG. 5 is an electrical schematic of the motor controls, battery, and brakes.
Figure 6:
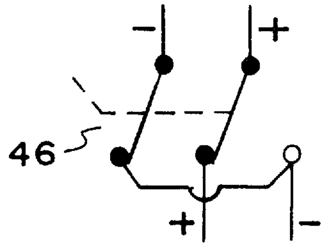
FIGS. 6 and 7 are an electrical schematic of the power switch showing forward and reverse motor control connections.
Figure 7:
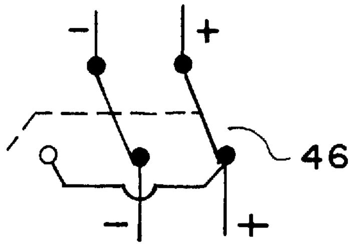

The brake control 45 operates the brake cables 48 which are connected to the powerwheels 22. Cable guide 58 on the power box 36 spreads the lower ends of power line 49. The gear drive 24 will normally, because of its internal friction, hold the walker/wheelchair 10 in a fixed position when the motors 21 are not actuated. However, for precision turning, the brake cables permit the user to secure one wheel in a fixed position so that the other power driven wheel can spin the unit around on itself. The power lines 49, as shown, carry the electrical current from the battery through the various switches to the motors. The seat switch 50 is also installed so that the unit cannot be operated as a wheelchair unless somebody is sitting on the seat. The seat pad 52 is normally placed above the seat switch 50 and padded so that the switch engagement with the user is not uncomfortable. A clutch 56 (see FIG. 5) permits the walker/wheelchair 10 to go into an unpowered free wheeling mode.

Provision are made for footrests 51 which, when in the wheelchair mode, support the two feet of the patient. On the other hand, once in the walker mode, it permits the patient to stand on top of the two footrests and convert the walker to a mechanism for transporting the patient above the surface for riding while standing. Desirably the footrest is pivotally secured at the lower portion of the driven leg 12 on an interior side of the driven leg such that each footrest pivot from a pivo which is perpendicular to the drive axis of the driven motor wheels at or below a horizontal plane of the drive axis of the driven wheels, wherein each footrest is pivotally secured along an inner side of each driven leg in an inoperable state and pivoted downward toward the opposing footrest between the driven legs to an operational state which is at or below the height of the drive axis of the driven wheels and between the driven legs. Also the footrest 51 may be secured to extensions from the driven legs 12.

The method of the invention relates primarily to the proportioning of the A-frame 11 and its pivotal maintenance at the vertex 15 so that folding of the two legs toward each other may be undertaken. The positioning of a bridge beam 28 to separate the A-frame on either side of the unit should be made so that the folding portion nests and interiorly of the vertex but above the wheels and the motor. By providing for an unobstructed space between the driven wheels, the casters can be stored adjacent the driven wheels. To do this it is only necessary that the tread distance between the caster wheels is short enough to permit the caster wheels to nest between the driven wheels. A further aspect of the method is the provision of controls on the control handles in such a position that they can be used in the wheelchair mode or the walker mode, or in the standing rider mode. Yet another aspect of the method is achieved by the tie 60 between the seat 19 and bridge beam 28 which assists in folding when the seat is raised.

Alternatives are contemplated by the present invention. Such alternatives relate to varying the size of the drive wheel, varying the size of the casters, combining the two casters into a single wheel through a caster bridge bar, which single wheel is optionally steerable thereby reducing the necessities for a brake control on the power wheels. Moreover, with the utilization of such a single wheel, joy stick type controls are employed on either the left arm, the right arm, or independently unsecured to the walker/wheelchair so that irrespective of the state of disability of the user, controls may be fashioned for purposes of permitting the patient to dominate the mobility of the unit.

It will be understood that various changes in the details, materials and arrangements of parts, or method which have been herein described and illustrated in order to explain the nature of the invention, may be made by those skilled in the art within the principle and scope of the invention as expressed in the appended claims.

What is claimed is:

1. A combination walker/wheelchair having a foldable frame and means for rolling the foldable frame on a surface comprising, in combination, a pair of opposed support members terminating at a vertex and pivotally secured at the top thereby forming an A-frame which is foldable;

said A-frame having a driven leg and a rolling leg;

said rolling leg terminating at its upper portion with an offset handle structure and its lower portion with a caster wheel;

a reversible motor secured to the lower portion of each driven leg, said motors desirably being opposed to each other and interiorly of the two driven legs;

a driven wheel having a drive axis secured operatively to each motor footrest pivotally mounted on an interior side of the driven leg such that each footrest pivots from a pivot axis that is perpendicular to the drive axis of each of said driven wheels and positioned at or below a horizontal plane of said drive axis, wherein the footrest are pivotally secured along an inner side of each driven leg in an inoperable state and pivoted downward toward the opposing footrest between the driven legs to an operational state which is at or below the height of the drive axis of the driven wheels--, was inserted;

each of said driven wheel and caster wheel having substantially the same diameter;

caster wheels secured to the lower portion of the rolling legs and spaced from each other permitting nesting between the relative motors at the lower portion of each driven leg when folded;

control means on said handle structure to permit adjusting the driving speed of the two motors, and substantially simultaneously permit reversing the direction of each such motor;

a bridge beam secured pivotally to each A-frame at a mid-position of each A-frame and said bridge beam pivoted at a mid-position to fold upwardly for folding said A-frame to permit the driven leg and the rolling leg to come closer to each other thereby reducing the angle at the vertex formed where the two said support members join;

whereby each driven wheel is connected to each motor, and each motor is secured to the lower portion of each driven leg for driving the driven wheels is secured to a pair of foldable A-frame members, which A-frame members, when folded, can collapse the unit for carrying, and controls are provided for use in the walking, standing, or wheelchair mode which can independently control each motor driven wheel in forward or reverse mode.

2. In a walker/wheelchair according to claim 1, a seat;

a seat support spreader between the rolling legs of each A-frame to thereby secure the parallel relationship between the A-frame legs and a second seat support spreader between the driven legs thereby supporting the seat.

3. In the walker/wheelchair according to claim 1, a footrest adjacent each driven wheel; whereby a rider seated in the wheelchair can rest his feet and when in the walker mode said rider can stand on said footrest to ride.

4. A walker/wheelchair combination comprising, a pair of opposed A-frames formed from a driven leg and a rolling leg which are pivotally secured at a vertex;

a bridge beam having a central pivot pivotally secured at a mid-position in each A-frame for folding to permit the driven leg and the rolling leg to come closer to each other;

a motor and driven wheel having a driving axis at the bottom of each driven leg, each driven leg each footrest pivotally secured to an interior side of the driven leg opposite the driven wheel such that each said footrest is pivotally secured from a pivot axis that is perpendicular to said drive axis of each of said driven wheel and positioned at or below a horizontal plane of said drive axis, wherein each footrest is positioned along an inner side of each driven leg in an inoperable state and pivoted downward toward the opposing footrest between the driven legs to an operational state which is at or below a height of the drive axis of the driven wheels;

a caster wheel at the bottom of each rolling leg;

said caster wheels and driven wheels having substantially the same diameter;

a seat support between a pair of opposed A-frames;

a seat secured to said seat support mean pivotally at one edge of the seat;

a leg spreader crossing between the two A-frames above the caster wheels;

control means including a gear box between the motor and the driven wheel;

brake means for the motor wheel; and means for folding the bridge beam including a tie member secured under the seat and connected to the central pivot of the bridge beam to thereby shorten the distance between the caster wheel and the driven wheel on each of the respective legs when the seat is pivoted for folding the walker wheelchair; whereby the driven wheel can be driven in one direction or the other, or put in an idle mode for pushing, and optionally the brake employed to secure one wheel against rotation while the other rotates, thereby sharply turning the walker/wheelchair on the wheel to which the brake has been applied.

5. In the walker/wheelchair according to claim 4, a foot support adjacent the driven wheel of the driven leg; whereby the foot support will rest the foot of the user in the wheelchair mode and permit the user to stand and ride in the walker mode.

6. A method for operating a combination walker/wheelchair, which walker/wheelchair is made of a pair of opposed essentially parallel A-frame members, one leg of said A-frame being a driven leg with a motor at the lower portion, the other leg being a rolling leg with a caster element at the lower portion, a handle at the upper portion of each rolling leg, said legs being spread each from the other by means of a bridge beam which folds upwardly, a foldable seat pivoted along one edge for providing a seated or walker configuration, the parallel A-frame members having a pair of caster wheels and a pair of driven wheels secured at the end portion of their respective caster legs and driven legs, in which said wheels have substantially the same diameter, the steps comprising, spacing the casters with a space therebetween narrower than the space between the driven wheels;

positioning a pair of footrests at the lower portion of each driven leg, each footrest is pivotally secured to an interior side of each driven leg opposite the driven wheel such that each said footrest is pivotally secured from a pivot axis that is perpendicular to a drive axis of each of said driven wheel and positioned at or below a horizontal plane of said drive axis, wherein each footrest is positioned along said interior side of each driven leg in an inoperable state and pivoted downward toward the opposing footrest between the driven legs to an operational state which is at or below a height of the drive axis of said driven wheels; so that in the seated position a patient may rest his foot on the footrest, whereas in the walker configuration, the patient may optionally stand on the footrest and use the footrest as a driven walker for going from place to place;

control means including a gear box between the motor and the driven wheel;

a clutch separating the motor from the driven wheel; and brake means for the motor wheel;

locating the brake and motor control means for each wheel on each handle;

whereby the motor wheel can be driven in one direction or the other, or put in an idle mode for pushing, and optionally the brake employed to secure one wheel against rotation while the other rotates, thereby sharply turning the unit on the wheel to which the brake has been applied and permitting the patient to use such controls whether seated, walking, or standing.

* * * * *